(12) United States Patent
Dhurandhar et al.

(10) Patent No.: US 11,507,787 B2
(45) Date of Patent: Nov. 22, 2022

(54) MODEL AGNOSTIC CONTRASTIVE EXPLANATIONS FOR STRUCTURED DATA

(71) Applicant: International Business Machines Corporation, Armonk, NY (US)

(72) Inventors: Amit Dhurandhar, Yorktown Heights, NY (US); Pin-Yu Chen, Yorktown Heights, NY (US); Karthikeyan Shanmugam, Yorktown Heights, NY (US); Tejaswini Pedapati, Yorktown Heights, NY (US); Avinash Balakrishnan, Yorktown Heights, NY (US); Ruchir Puri, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1015 days.

(21) Appl. No.: 16/217,574

(22) Filed: Dec. 12, 2018

(65) Prior Publication Data
US 2020/0193243 A1   Jun. 18, 2020

(51) Int. Cl.
G06K 9/62 (2022.01)
G06F 16/24 (2019.01)
G06N 3/04 (2006.01)
G06F 7/22 (2006.01)

(52) U.S. Cl.
CPC ............ *G06K 9/6285* (2013.01); *G06F 7/22* (2013.01); *G06F 16/24* (2019.01); *G06N 3/04* (2013.01)

(58) Field of Classification Search
CPC ......... G06K 9/6285; G06F 16/24; G06F 7/22; G06F 2207/4824; G06N 3/04; G06N 3/0454; G06N 3/08; G06N 3/02; G06N 20/00
USPC ................................ 706/15, 20, 12; 707/614
See application file for complete search history.

(56) References Cited

U.S. PATENT DOCUMENTS

| | | | |
|---|---|---|---|
| 7,050,953 B2 | 5/2006 | Chiang et al. | |
| 7,773,813 B2 | 8/2010 | Hua et al. | |
| 9,772,741 B2 | 9/2017 | Aliferis et al. | |
| 9,836,455 B2 | 12/2017 | Martens et al. | |
| 9,858,533 B2 | 1/2018 | Aliferis et al. | |
| 2019/0236134 A1* | 8/2019 | Galitsky | G06F 40/35 |
| 2019/0378210 A1* | 12/2019 | Merrill | G06N 3/0454 |
| 2020/0022016 A1* | 1/2020 | Fenoglio | H04W 28/0268 |
| 2022/0036221 A1* | 2/2022 | Hargras | G06N 5/045 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Evan Aspinwall
(74) *Attorney, Agent, or Firm* — Peter Edwards, Esq.; McGinn I.P. Law Group, PLLC.

(57) ABSTRACT

A method, system, and computer program product, including generating a contrastive explanation for a decision of a classifier trained on structured data, highlighting an important feature that justifies the decision, and determining a minimal set of new values for features that alter the decision.

22 Claims, 7 Drawing Sheets

(56) References Cited

OTHER PUBLICATIONS

Jonas Sjöberg, Qinghua Zhang, Lennart Ljung, Albert Benveniste, Bernard Delyon, Pierre-Yves Glorennec, Hakan Hjalmarsson, and Anatoli Juditsky, "Nonlinear black-box modeling in system identification: a unified overview," Automatica 31, No. 12 (1995): 1691-1724.
Conor Nugent, and Pádraig Cunningham, "A case-based explanation system for black-box systems," Artificial Intelligence Review 24, No. 2 (2005): 163-178.
Marco Tulio Ribeiro, Sameer Singh, and Carlos Guestrin, "Why Should I Trust You?: Explaining the predictions of any classifier," Proceedings of the 22nd ACM SIGKDD international conference on knowledge discovery and data mining, pp. 1135-1144. ACM, 2016.
Riccardo Guidotta, Anna Monreale, Salvatore Ruggieri, Franco Turini, Fosca Giannotti, and Dino Pedreschi, "A survey of methods for explaining black box models," ACM Computing Surveys (CSUR) 51, No. 5 (2018): 93.

* cited by examiner

Algorithm 1 Model Agnostic Contrastive Explanations Method (MACEM)

Input: example $(x_0, t_0)$, black box model $\mathcal{M}$ and optionally base values $\mathbf{b}$, allowed space $\mathcal{X}$, $(\gamma > 0)$ an autoencoder $AE$.

1) Solve and obtain,
$$\delta^{pos} \leftarrow \operatorname{argmin}_{\delta \in \Delta_{PP}} \; c \cdot f_\kappa^{pos}(x_0, \delta) + \beta \|x_0 + \delta - \mathbf{b}\|_1 + \|x_0 + \delta - \mathbf{b}\|_2^2 + \gamma \|x_0 + \delta - AE(x_0 + \delta)\|_2^2.$$

2) Solve and obtain,
$$\delta^{neg} \leftarrow \operatorname{argmin}_{\delta \in \Delta_{PN}} \; c \cdot f_\kappa^{neg}(x_0, \delta) + \beta \|\delta\|_1 + \|\delta\|_2^2 + \gamma \|x_0 + \delta - AE(x_0 + \delta)\|_2^2.$$

return $\delta^{pos}$ and $\delta^{neg}$. {Explanation: The input $x_0$ would still be classified into class $t_0$ even if its feature values were (closer to base values as in) $\delta^{pos}$. However, its class would change if it were perturbed (away from base values) by $\delta^{neg}$, i.e., if the input became $x_0 + \delta^{neg}$.

MODEL AGNOSTIC CONTRASTIVE EXPLANATIONS FOR STRUCTURED DATA

BACKGROUND

The present invention relates generally to a model agnostic contrastive explanations method, and more particularly, but not by way of limitation, to a system, method, and recording medium for a model agnostic contrastive explanations method (MACEM) to generate contrastive explanations for any classification model assuming only oracle access (i.e., one is able to only query the class probabilities for a desired input).

Given the widespread use of deep networks across various applications and their black box nature, explainability in artificial intelligence (XAI) has been one of the problems at the forefront in Artificial intelligence (AI) research.

Government agencies call for creating interpretable solutions and the General Data Protection Regulation (GDPR) passed in Europe, which requires businesses to provide understandable justifications to their users for decisions that may affect them, has made this need even more acute.

Contrastive explanations are a rich form of explanation where one conveys not only what is (minimally) sufficient to justify the class of an input (i.e., pertinent positives (PPs)), but also what should be (minimally) necessarily absent to maintain the original classification (i.e., pertinent negatives (PNs)).

Conventionally, there have been many (post hoc) interpretability methods proposed to interpret decisions of neural networks that each assume complete access to the model. Locally-interpretable model-agnostic explanation method (LIME) is amongst the few that can provide local explanations for any model with just oracle access. In other words, LIME just needs to be able to query the classification model and based on its outputs can generate an explanation. This is an extremely attractive feature as it can be used in settings where the model owner may not want to expose the inner details of the model, but may desire local explanations using, for example, a remote service. Another application is that the method can be used to interpret decisions not just of neural networks, but also other models such as random forests, boosted trees and ensembles of heterogeneous models, which are known to perform quite well in many domains that use structured data.

However, even still, there is a need in the art for a model agnostic contrastive explanations method (MACEM) that requires only oracle access to the classification model with particular focus on structured data. Indeed, structured data can be composed of real and categorical features, and there is a need to provide a principled way of creating contrastive explanations for such data.

Conventional methods are restricted to differentiable models such as deep neural networks and strong (implicit) assumptions were made in terms of the semantics of the data used to train the models and obtain explanations. In particular, complete access to a model is assumed in prior techniques. Moreover, in the conventional techniques, a value of '0' for a feature was considered as the base value, with positive deviation from it being indicative of more interesting values or values that have more signal (i.e., strength). However, this may not be the case for many features especially those that are categorical. Ideally, the user should provide these values. However, in many situations this may not be the case. Also, in the conventional techniques all features were considered to be real valued and no special consideration was given to handle categorical features.

SUMMARY

In view of the technical problems in the art, the inventors have invented a technical improvement to address the technical problem that includes a model agnostic contrastive explanations method (MACEM) that requires only oracle access to the classification model with particular focus on structured data. The method can be used for any classification model that may be differentiable or non-differentiable (e.g., decision trees, forests, ensembles, etc.), where one estimates gradients (with theoretically bounded bias) using only oracle access, can be adapted to utilize given base values and also propose ways to estimate them from the data using best judgment in situations that they are not provided, provide considerations that categorical features are fundamentally different than real valued ones and propose principled approaches to handle them given the form of explanations, and a new way to compute pertinent positives (PP) and pertinent negatives (PN).

In an exemplary embodiment, the present invention can provide a computer-implemented method for model agnostic contrastive explanations for interpreting a deep neural network, the model agnostic contrastive explanation method including generating a contrastive explanation for a decision of a classifier trained on structured data, highlighting an important feature that justifies the decision, and determining a minimal set of new values for features that alter the decision.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
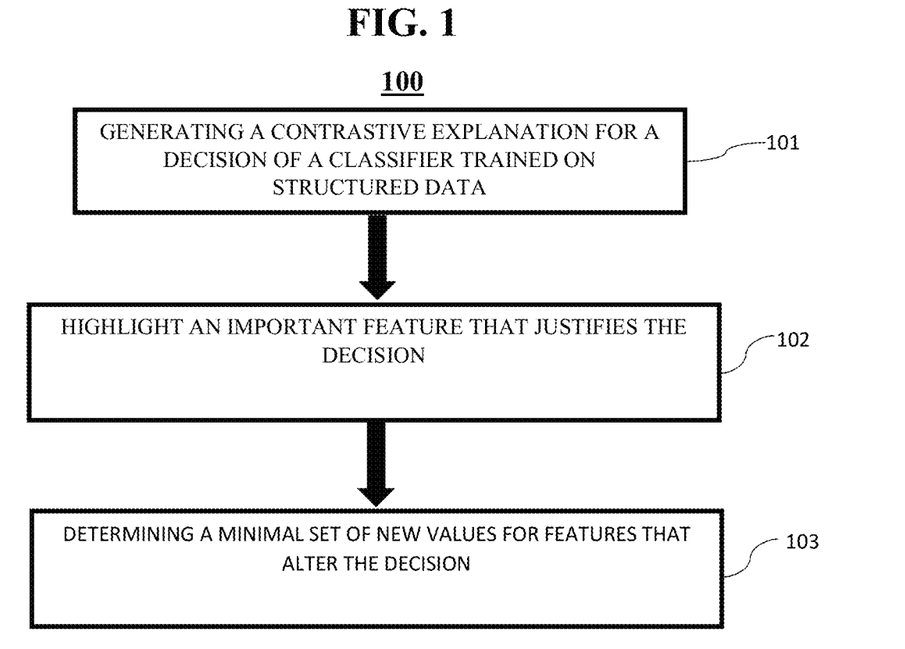
FIG. 1 exemplarily shows a high-level flow chart for a model agnostic contrastive explanations method (CEM) 100.

With reference now to the example depicted in FIG. 1, the model agnostic contrastive explanations method 100 includes various for providing contrastive explanations for decisions of any black box classifier that may be differentiable or not learned on tabular data by estimating gradients providing different ways of handling categorical variables, defining a base value of zero signal differently, and extending definitions of pertinent positives (PP) and pertinent negatives (PN) so as to provide qualitatively best solutions. The invention can use zeroth order optimization to estimate gradients.

Figure 5:
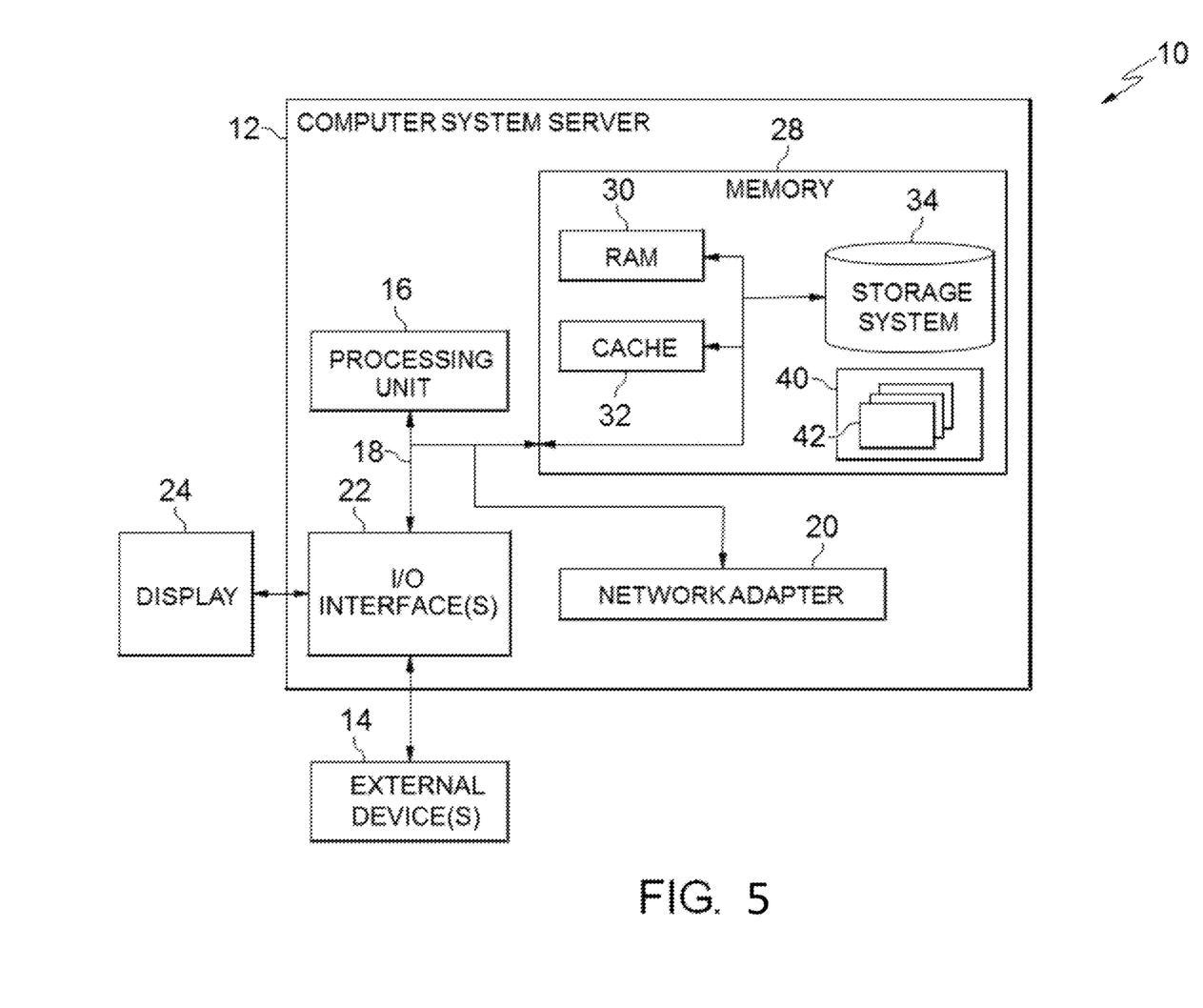
FIG. 5 depicts a cloud computing node 10 according to an embodiment of the present invention.

As shown in at least FIG. 5, one or more computers of a computer system 12 according to an embodiment of the present invention can include a memory 28 having instructions stored in a storage system to perform the steps of FIG. 1.

Although one or more embodiments (see e.g., FIGS. 5-7) may be implemented in a cloud environment 50 (see e.g., FIG. 6), it is nonetheless understood that the present invention can be implemented outside of the cloud environment.

With reference generally to FIGS. 1-4, the method 100 generates (local) explanations for decisions of (arbitrary) classifiers trained on structured data. That is, in step 101, the invention generates a contrastive explanation for a decision of a classifier trained on structured data. In step 102, an important feature is highlighted that justifies the decision. And, in step 103, a minimal set of new values is determined for features that alter the decision.

It is noted that for the purposes of this invention, structural data is defined as data in tabular format where each feature can take specific values as opposed to freeform text or images.

It is noted that for the purposes of this invention, "an important feature" is defined as a feature that strongly affects the output. In other words, changing this feature will also result in significant changes to the output.

It is noted that for the purposes of this invention, a minimal set of new values are defined as changing a minimal number of important features by a minimal amount.

Figure 4:
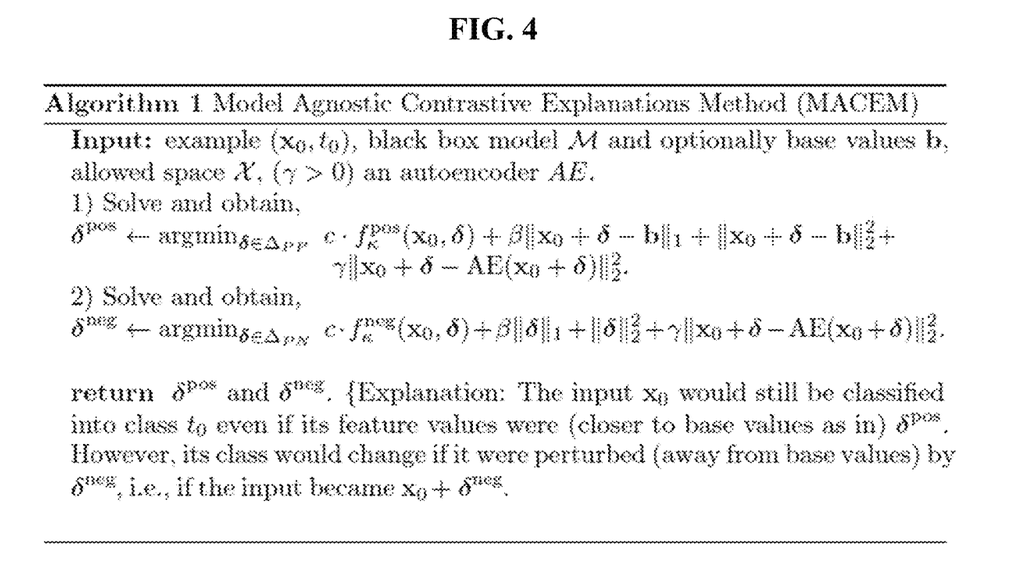
FIG. 4 exemplarily depicts a first algorithm according to an embodiment of the present invention.

The exemplary algorithm of FIG. 4 is used to generate the explanations. To formulate this, let X denote the feasible data space and let $(x_0, t_0)$ denote an example $x_0 \in X$ and its inferred class label to obtained from a black-box classification model. The modified example $x \in X$ based on $x_0$ is defined as $x = x_0 + \delta$, where $\delta$ is a perturbation applied to $x_0$. The method of finding pertinent positives/negatives is formulated as an optimization problem over the perturbation variable $\delta$ that is used to explain the model's prediction results. The prediction of the model on the example x is denoted by Pred(x), there Pred(•) is any function that outputs a vector of confidence scores over all classes, such as the log value of prediction probability.

Figure 2:
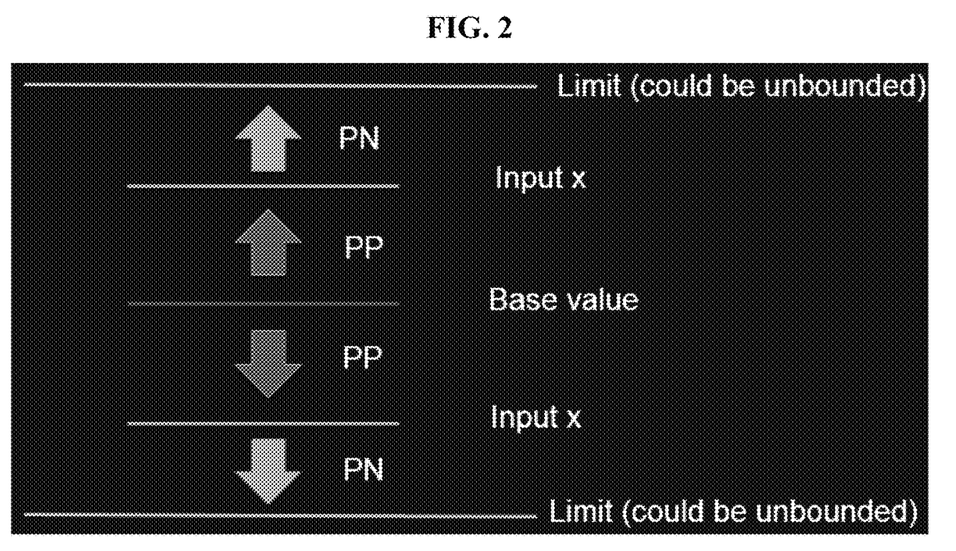
FIG. 2 exemplarily depicts a visual representation of PPs and PNs according to an embodiment of the present invention.

FIG. 2 shows a visual representation of PPs and PNs. Depending on where the input x lies relative to the base value, the PPs and PNs will be above or below the base value. However, in both cases the search moves away from the base value for both PPs and PNs. The base value may be selected or calculated based on the semantics of the features.

For pertinent positives, assume an example $x_0$ has d features each with base values $\{b_i\}_{i=1}^d$. Let $\Delta_{PP}$ denote the space $\{\delta : |x_0 + \delta - b| \leq |x_0 - b|$ and $x_0 + \delta \in \chi\}$, where $b = [b_1, \ldots, b_d]$, and $|\bullet|$ and $\leq$ implies element-wise absolute value and inequality, respectively. To solve for a PP, the invention provides the following problem formulation:

$$\min_{\delta \in \Delta_{PP}} c \cdot f_\kappa^{pos}(x_0, \delta) + \beta \|x_0 + \delta - b\|_1 + \quad (1)$$

$$\|x_0 + \delta - b\|_2^2 + \gamma \|x_0 + \delta - AE(x_0 + \delta)\|_2^2. \quad (2)$$

The first term $f_\kappa^{pos}(x_0, \delta)$ is a designed loss function that encourages the modified example $x = x_0 + \delta$ relative to the base value vector b, defined as x−b, to be predicted as the same class as the original top-1 label $t_0 = \arg\max_i [\text{Pred}(x_0)]_i$. The loss function is defined as equation (3):

$$f_\kappa^{pos}(x_0, \delta) = \max\left\{\max_{i \neq t_0}[Pred(x_0 + \delta)]_i - [Pred(x_0 + \delta)]_{t_0}, -\kappa\right\}. \quad (3)$$

The loss function $f_\kappa^{pos}$ is a hinge-like loss and the term $\kappa \geq 0$ controls the gap between $[\text{Pred}(x_0+\delta)]_{t_0}$ and the other most probable class. In particular, the loss attains its minimal value when $[\text{Pred}(x_0+\delta)]_{t_0}$ is $\kappa$ larger than $\max_{i \neq t_0}|\text{Pred}(x_0+\delta)]_i$. The parameter $c \geq 0$ is the regularization coefficient associated with $f_\kappa^{pos}$. The second and third terms in (1) are jointly called the elastic-net regularizes, which aids in selecting a set of highly relevant features from x−b, and the parameter $\beta \geq 0$ controls the sparsity of the vector x−b. In other words, if the i-th element of x−b is 0, this means the i-th is not significant for being a PP.

Optionally, an auto-encoder also maybe learned on the data which could be used to further direct the search so that a realistic or high probability x is produced.

For PNs, let $\Delta_{PN}$ denote the space $\{\delta : |x_0+\delta-b| \geq |x_0-b|$ and $x_0+\delta \in \chi\}$. To solve for PN, the following problem formulation (4) and (5) are described:

$$\min_{\delta \in \Delta_{PN}} c \cdot f_k^{neg}(x_0, \delta) + \beta \|\delta\|_1 + \|\delta\|_2^2 + \gamma \|x_0 + \delta - AE(x_0+\delta)\|_2^2, \quad (4)$$

where $$f_k^{neg}(x_0, \delta) = \max\left\{[Pred(x_0+\delta)]_{t_0} - \max_{i \neq t_0}[Pred(x_0+\delta)]_i, -\kappa\right\}. \quad (5)$$

In other words, for a PN, the inventions aims to find the least modified changes in $\delta \in \Delta_{PN}$, evaluated by the elastic-net loss on $\delta$, such that its addition to $x_0$ leads to a different top-1 prediction from $t_0$.

The details of how the optimization of the above objectives is implemented along with estimation and modeling of certain key aspects is presented next. For the optimization procedure, if the gradient of the designed loss functions for PP and PN with respect to δ can be obtained, then one can readily apply a projected fast iterative shrinkage-thresholding algorithm (FISTA) to solve equations (4) and (1). However, in the black-box setting such gradient is inadmissible. How to get around this problem is described below.

Here, it is first illustrated how FISTA solves for a PP and a PN, assuming the gradient is available. FISTA is an efficient solver for optimization problems involving L1 regularization. Taking pertinent negative as an example, let $g(\delta) = f_\kappa^{neg}(x_0, \delta) + \|\delta\|_2^2$ denote the objective function of (4) without the L1 regularization term. Given the initial iterate $\delta^{(0)} = 0$, projected FISTA iteratively updates the perturbation I times by:

$$\delta^{(k+1)} = \prod_{\Delta_{PN}} \{S_\beta(y^{(k)} - \alpha_k \nabla g(y^{(k)}))\}; \quad (6)$$

$$y^{(k+1)} = \prod_{\Delta_{PN}} \left\{\delta^{(k+1)} + \frac{k}{k+3}(\delta^{(k+1)} - \delta^{(k)})\right\}, \quad (7)$$

where $\Pi_{\Delta_{PN}}$ denotes the vector projection onto the set $\Delta_{PN}$, $\alpha_k$ is the step size, $y^{(k)}$ is a slack variable accounting for momentum acceleration with $y^{(0)} = \delta^{(0)}$, $S_\beta: \mathbb{R}^p \mapsto \mathbb{R}^p$ is an element-wise shrinkage-thresholding function defined as (8):

$$[S_\beta(z)]_i = \begin{cases} z_i - \beta, & \text{if } z_i > \beta; \\ 0, & \text{if } |z_i| \leq \beta; \\ z_i + \beta, & \text{if } z_i < -\beta, \end{cases} \quad (8)$$

where for any $i \in \{1, \ldots, d\}$. The final perturbation $\delta^{(k)}$ for pertinent negative analysis is selected from the set $\{\delta^{(k)}\}_{k=1}^J$ such that $f_\kappa^{neg}(x_0, \delta^{(k*)}) = 0$ and $k^* = \arg\min_{k \in \{1, \ldots, I\}} \beta \|\delta\|_2^2$. A similar projected FISTA optimization approach is applied to pertinent positive analysis.

In the black-box setting, in order to balance the model query complexity and algorithmic convergence rate using zeroth-order optimization, a two-point evaluation is used based on a gradient estimator averaged over q different random directions. Specifically, given a scalar function $f(\cdot)$, its gradient at a point $x \in \mathbb{R}^d$ is estimated by:

$$\hat{\nabla} f(x) = \frac{d}{q\mu} \sum_{j=1}^{q} \frac{f(x + \mu u_j) - f(x)}{\mu} \cdot u_j, \quad (9)$$

where $\{u_j\}_{j=1}^q$ is a set of i.i.d. random directions drawn uniform from a unit sphere, and $\mu > 0$ is a smoothing parameter.

The estimation error between $\nabla f(x)$ and the true gradient $\nabla f(x)$ can be analyzed through a smoothed function $f\mu(x) = \mathbb{E}_{u \in U_b}[f(x+\mu u)]$, where $U_b$ is a uniform distribution over the unit Euclidean ball. Assume f is an L-smooth function, that is, its gradient $\nabla f$ is L-Lipschitz continuous. $\hat{\nabla} f(x)$ is an unbiased estimator of the gradient $\nabla f\mu(x)$, i.e., $\mathbb{E}_u[\hat{\nabla} f(x)] = \hat{\nabla} f(x)$. Moreover, using a bounded error between f and $f_\mu$, one can show that the mean squared error between $\hat{\nabla} f(x)$ and $\nabla f(x)$ is upper bounded by equation (10):

$$\mathbb{E}_u[\|\hat{\nabla} f(x) - \nabla f(x)\|_2^2] \leq O\left(\frac{q+d}{q}\right) \|\nabla f(x)\|_2^2 + O(\mu^2 L^2 d^2). \quad (10)$$

As discussed above, ideally, one would want base values as well as allowed ranges or limits for all features to be specified by the user before running the method to obtain contrastive explanations. This should in all likelihood provide the most useful explanations. However, this may not always be feasible given the dimensionality of the data and the level of expertise of the user. In such situations, the invention computes base values using a best judgment (i.e., an assumption).

For real-valued features, the invention sets the base value to be the median value of the feature. For example, if a feature has values [0, 0, 0, −1, 10] the base value would be 0. This without knowing anything more about the feature is possibly the least interesting value for that feature. Moreover, medians are known to be robust to outliers and are thus preferable to using means. They also are a point estimate that has minimum $L_1$ error with reference to the values for that feature. Medians also make intuitive sense where for sparse features 0 would rightly be chosen as the base value as opposed to some other value which would be the case for means.

For categorical features, the invention sets the base value to be the mode or most frequent value for that feature. For example, if we have a feature indicating grades of students such as [A, B, C, C, B, C], then C would be set as the base value. It is noted that a more uniquely occurring value is probably more interesting to the user. For example, in a dataset containing health records most people will probably not have cancer and so having cancer is something that should stand out as it indicates a state away from the norm. Such states or behaviors are believed to carry information that is more likely to surprise the user and draw attention, which could be a prelude to further actions.

Given that categorical features do not impose an explicit ordering like real features do along with the fact that only the observed values have semantic meaning, there is a need to be model them differently than real features when obtaining explanations. The invention considers two different strategies for handling categorical features in the framework along with a formal interpretation of what these strategies are actually accomplishing.

First, a frequency map approach (FMA) is considered. In this approach, the invention directly leverages the optimization procedure described above where one needs to define an ordered set/interval in which to find the perturbations for both PPs and PNs. As described above for categorical features, the invention sets the base value to be the mode of the values that occur. Given this, a natural ordering can be created based on the frequencies of the different values. Thus, the least frequent value would be considered the farthest from the base value. Based on this, the invention can map the k discrete values $v_{i1}, \ldots, v_{ik}$ of the i-th feature occurring with frequencies/counts $c_{i1}, \ldots, c_{ik}$ to real values $r_{i1}, \ldots, r_{ik}$ respectively in the [0, 1] interval using the following mapping (11) for any $j \in \{1, \ldots, k\}$:

$$r_{ij} = \frac{c_{max} - c_{ij}}{c_{max} - 1} \quad (11)$$

where $$c_{max} = \max_{j \in \{1, \ldots, k\}} c_{ij}.$$

This maps the discrete value with the highest frequency to 0 making it the base value, while all other values with decreasing frequencies lie monotonically away from 0. Every candidate value has to have a frequency of at least 1 and so every discrete value gets mapped to the [0, 1] interval. Equation (11) divides by $c_{max}-1$, rather than $c_{max}-c_{min}$, where $$c_{min} = \min_{j \in \{1, \ldots, k\}} c_{ij}$$

since one does not want values that occur with almost equal frequency to be pushed to the edges of the interval as based on the inventive modeling they are of similar interest. For example, a feature may just have two values occurring with frequencies of 50 and 49. The invention can switch between these values easily when finding PPs and PNs rather than mapping them to two ends of the interval (i.e., 50 to 0 and 49 to 1). This is particularly important when it is noticed that a different categorical feature may have more extreme frequencies such as 50 and 10, and one wants to maintain this relative difference between features in the mapping.

Based on equation (11), the invention runs the algorithm depicted in FIG. 4 for categorical features in the interval [0, 1], where every time the model is queried, the invention rounds the $x_0+\delta$ to the closest so that a valid categorical value $v_{ij}$ can be mapped back to and sent as part of the query input.

Figure 3:
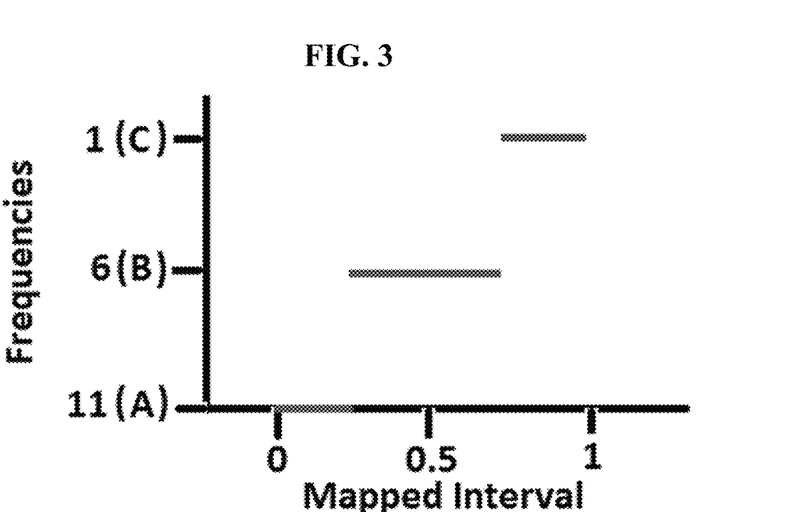
FIG. 3 exemplarily depicts a graphical representation of a categorical feature taking three values A, B and C with frequencies 11, 6 and 1, respectively, as indicated on the vertical axis, according to an embodiment of the present invention.

It is noted that, rather than optimizing $f_\kappa^{neg}(x_0, \delta)$ or $f_\kappa^{pos}(x_0, \delta)$, the invention is optimizing $f_\kappa^{neg}(h(x_0, \delta))$ or $f_\kappa^{pos}(h(x_0, \delta))$ where $h(.)$ is the identity map for real features, that is $f_\kappa^{neg}(h(x_0, \delta))=f_\kappa^{neg}(x_0, \delta)$ and $f_\kappa^{pos}(h(x_0, \delta))=f_\kappa^{pos}(x_0, \delta)$, but a step function defined over the [0, 1] interval for categorical features. Let $h_i(.)$ denote the application of the function $h(.)$ to the categorical feature i. If $x=x_0+\delta$ and $x_i$ denotes the value of the feature in the mapped [0, 1] interval, then equation (12) is, $$h_i(x_0,\delta)=v_{ij}, \text{ if } |x_i-r_{ij}| \leq |x_i-r_{im}| \forall m \in \{1, \ldots, k\} \text{ and } m \neq j \quad (12)$$

where |.| denotes absolute value. An example function $h(.)$ is depicted in FIG. 3, where it is shown how the mapping occurs and how values in the [0, 1] interval are mapped back to valid categorical values by rounding to the closest $r_{ij}$. For example, FIG. 3 shows a categorical feature taking three values A, B and C with frequencies 11, 6 and 1 respectively as indicated on the vertical axis. The mapping function in equation (11) for FMA maps these frequencies and hence the categorical values to 0, 0.5 and 1 in the [0, 1] interval. The horizontal lines depict the function $h(.)$ showcasing the range of values that map back to either A, B or C.

Second, a simplex sampling approach is considered. In this approach of handling categorical variables, the invention assumes a one-hot encoding of the input. Let $x=[x_C x_R]$ be the input feature vector where $x_C$ denotes the categorical part while $x_R$ denote the set of real features. Let there be C categorical features in total. Then, for all $c \in [1:C]$, $x_c \in [1:d_c]$ where $x_c$ is the c-th categorical variable and it takes one of $d_c$ values. Note that no ordering is implied amongst the $d_c$ values. Generically they are assumed to have distinct integer values from 1 till $d_c$.

For one-hot encoding, it is assumed that x is processed into $\tilde{x}=[\tilde{x}_C \tilde{x}_R]$ where $\tilde{x}_R=x_R$ while $\tilde{x}_C \in \mathbb{R}^{1 \times \Pi_{c \in C} d_c}$. And each component $\tilde{x}_c \in \mathbb{R}^{1 \times d_c}$ is set to $e_i$, the canonical unit vector with 1 in the i-th coordinate, if $x_c$ takes the value i.

For simplex sampling, an interpretation is provided when every categorical component c lies in the $d_c$ dimensional simple (i.e., when $\tilde{x}_c \in \Delta_{d_c}$). Here, $\Delta_N$ denotes the N-dimensional simplex. The actual function can be evaluated only on the inputs where each categorical component takes values from one of the corner points on the simplex, namely $e_i$, $i \in [1:d_c]$. Therefore, the function is interpolated when is assigned a real vector in the simplex.

Let $f(\cdot)$ that captures the soft output of the classifier when the one-hot encoded categorical variables take the values at the corner points of their respective simplices. Now, the invention extends the definition of f as follows in equation (13):

$$f([\tilde{x}_C x_R]) = \mathbb{E}_{e_{i_c} \sim \tilde{x}_c, \forall c \in [1:C]}[f(e_{i_1}, \ldots e_{i_C}, x_R)]. \quad (13)$$

Essentially, the invention samples the c-th unit vector from the distribution represented by $\tilde{x}_c \in \Delta_{d_c}$ on the simplex independent of other categorical variable. The function value is the expected value of the functional evaluated on unit vectors obtained from this product distribution along with the fixed real coordinates $x_R$.

When the invention performs the gradient descent as a part of the first algorithm in FIG. 4, the invention does a projected gradient descent $\tilde{x}_c$ in the product of simplices $\Delta_{d1} \times \ldots \Delta_{dc}$. One cannot evaluate the function exactly. Hence, the invention can average over a certain number of samples drawn from the product distribution for every function evaluation on a candidate $\tilde{x}$.

Thereby, the invention can use either one of the approaches (i.e., a frequency map approach (FMA) or the simplex sampling approach). Each approach has its advantages. The FMA approach can take more general format of inputs as they do not need to be one-hot-encoded. This leads to the FMA approach being significantly more efficient as it requires less number of oracle calls, and there is no need to increase the feature space using one-hot-encoding or some other form of encoding.

The hot-encoded approach has possibly stronger theoretically grounding. However, the approach requires a lot of additional averaging through sampling for every function evaluation (only noisy function evaluations can be obtained). Additionally, this also requires repeated projections to the simplices defined for every categorical variable during gradient descent to optimize the objective in the algorithm of FIG. 4.

Thus, based on the above, the invention includes a method that provides contrastive explanations for decisions of any black box classifier that may be differentiable or not learned on tabular data. This differs from previous methods in several ways because the invention can estimate gradients, the invention can provide different ways of handling categorical variables, the invention can define the base value of zero signal differently, and a definition of PPs and PNs may be extended so as to provide qualitatively best solutions.

Exemplary Aspects, Using a Cloud Computing Environment

Although this detailed description includes an exemplary embodiment of the present invention in a cloud computing environment, it is to be understood that implementation of the teachings recited herein axe not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 11, computer system/server 12 is shown in the form of a general-purpose computing circuit.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (110) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/sewer 12. Examples, include, but are not limited to: microcode, circuit drivers, redundant processing units, external disk drive arrays, RAID systems, tape drives, and data archival storage systems, etc.

Figure 6:
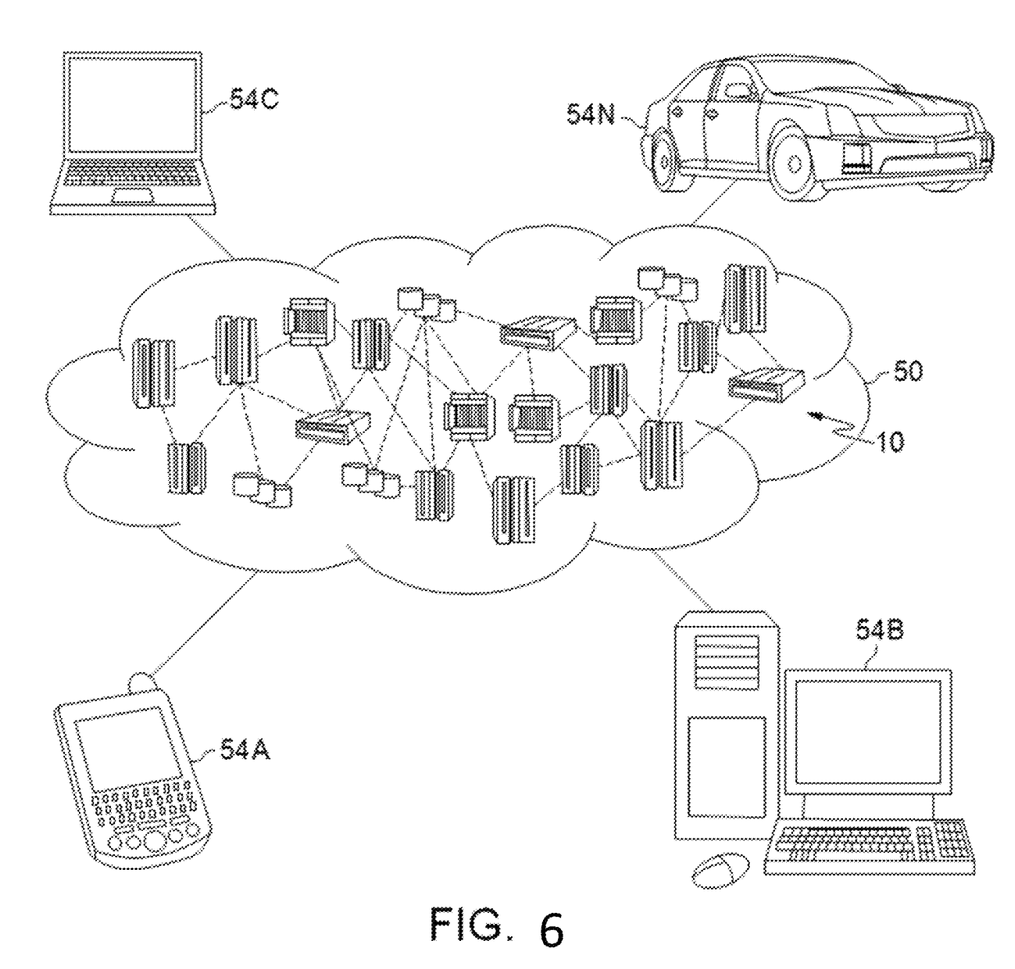
FIG. 6 depicts a cloud computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Figure 7:
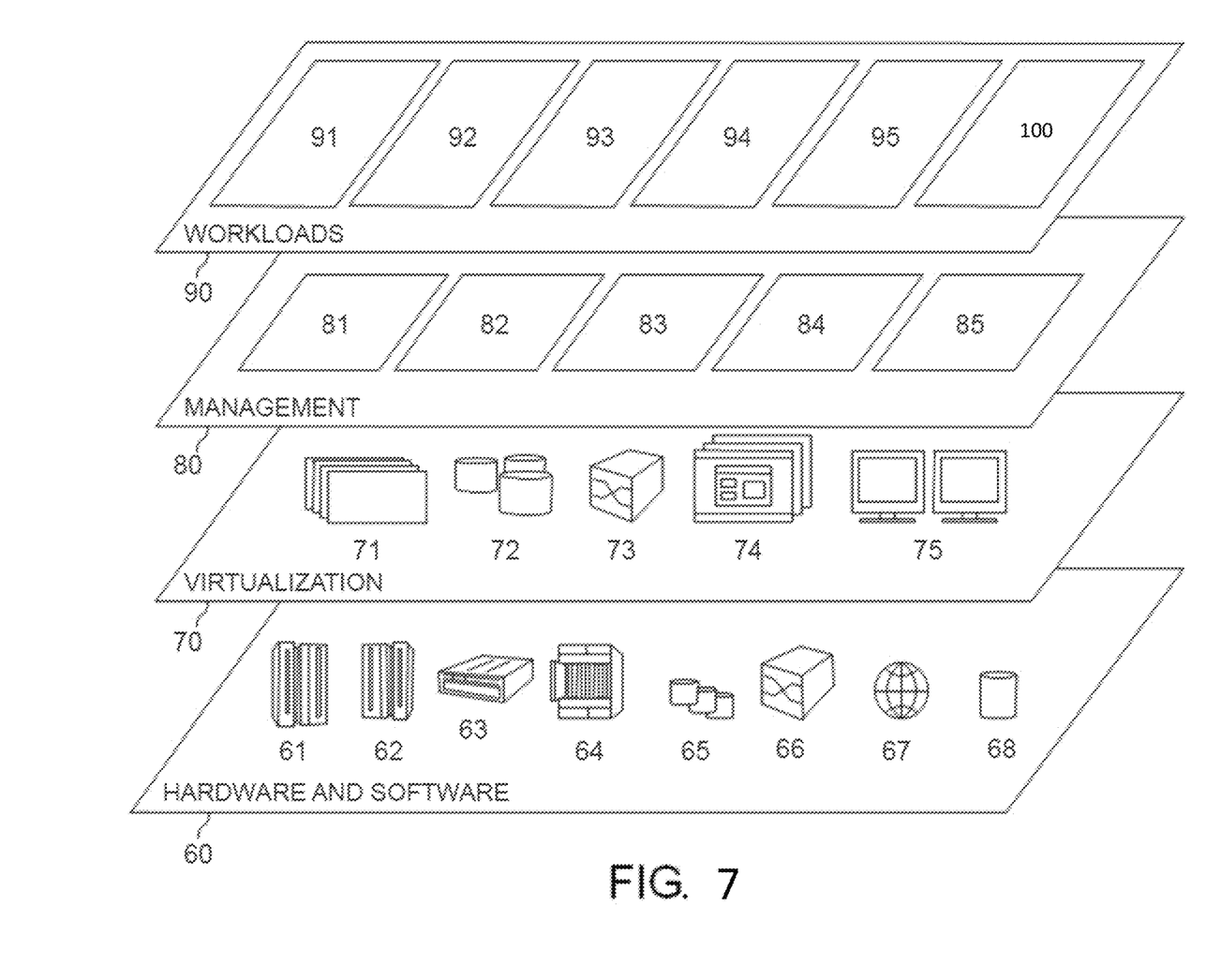
FIG. 7 depicts abstraction model layers according to an embodiment of the present invention.

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implement the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for model agnostic contrastive explanations for interpreting a deep neural network (DNN), the model agnostic contrastive explanation method comprising:
   generating a contrastive explanation for a decision of a classifier trained on structured data;
   highlighting an important feature that justifies the decision; and
   determining a minimal set of new values for features that alter the decision,
   wherein the generating uses a zeroth-order optimization to estimate a gradient of designed loss functions for pertinent positives (PP) and pertinent negatives (PN) for the contrastive explanation.

2. The computer-implemented method of claim 1, wherein the generating generates the contrastive explanation for any classification model that has only oracle access.

3. The computer-implemented method of claim 1, wherein the generating is only able to query class probabilities for a desired input to generate the contrastive explanation.

4. The computer-implemented method of claim 1, wherein, for real-valued features, the generating sets a base value as a median value of the feature.

5. The computer-implemented method of claim 1, wherein, for categorical features, the generating sets a base value as a mode for that feature.

6. The computer-implemented method of claim 1, wherein, for categorical features, the generating uses one of a frequency map approach (FMA) and a simplex sampling approach to handle the categorical features.

7. The computer-implemented method of claim 1, embodied in a cloud-computing environment.

8. A computer program product for model agnostic contrastive explanations for interpreting a deep neural network (DNN), the computer program product comprising a computer-readable storage medium having program instructions embodied therewith, the program instructions executable by a computer to cause the computer to perform:
   generating a contrastive explanation for a decision of a classifier trained on structured data;
   highlighting an important feature that justifies the decision; and
   determining a minimal set of new values for features that alter the decision,
   wherein the generating uses a zeroth-order optimization to estimate a gradient of designed loss functions for pertinent positives (PP) and pertinent negatives (PN) for the contrastive explanation.

9. The computer program product of claim 8, wherein the generating generates the contrastive explanation for any classification model that has only oracle access.

10. The computer program product of claim 8, wherein the generating is only able to query class probabilities for a desired input to generate the contrastive explanation.

11. The computer program product of claim 8, wherein, for real-valued features, the generating sets a base value as a median value of the feature.

12. The computer program product of claim 8, wherein, for categorical features, the generating sets a base value as a mode for that feature.

13. The computer program product of claim 8, wherein, for categorical features, the generating uses one of a frequency map approach (FMA) and a simplex sampling approach to handle the categorical features.

14. A system for model agnostic contrastive explanations for interpreting a deep neural network (DNN), said system comprising:
   a processor; and
   a memory, the memory storing instructions to cause the processor to perform:
     generating a contrastive explanation for a decision of a classifier trained on structured data;
     highlighting an important feature that justifies the decision; and
     determining a minimal set of new values for features that alter the decision,
   wherein the generating uses a zeroth-order optimization to estimate a gradient of designed loss functions for pertinent positives (PP) and pertinent negatives (PN) for the contrastive explanation.

15. The system of claim 14, wherein the generating generates the contrastive explanation for any classification model that has only oracle access.

16. The system of claim 14, wherein the generating is only able to query class probabilities for a desired input to generate the contrastive explanation.

17. The system of claim 14, wherein, for real-valued features, the generating sets a base value as a median value of the feature.

18. The system of claim 14, wherein, for categorical features, the generating sets a base value as a mode for that feature.

19. The system of claim 14, wherein, for categorical features, the generating uses one of a frequency map approach (FMA) and a simplex sampling approach to handle the categorical features.

20. The system of claim 14, embodied in a cloud-computing environment.

21. A computer-implemented method for model agnostic contrastive explanations for interpreting a deep neural network (DNN), the model agnostic contrastive explanations method comprising:
   generating a contrastive explanation for a decision of a classifier trained on structured data based only on a query class probabilities for a desired input,
   wherein the generating uses a zeroth-order optimization to estimate a gradient of designed loss functions for pertinent positives (PP) and pertinent negatives (PN) for the contrastive explanation.

22. A computer-implemented method for model agnostic contrastive explanations for interpreting a deep neural network (DNN), the model agnostic contrastive explanations method comprising:

providing contrastive explanations for decisions of any black box classifier that are differentiable or not learned on tabular data, wherein a zeroth-order optimization is utilized to estimate a gradient of designed loss functions for pertinent positives (PP) and pertinent negatives (PN) for the contrastive explanation.

\* \* \* \* \*